Dec. 30, 1952   G. E. ROWE   2,623,648
GLASSWARE TRANSFER APPARATUS
Filed Dec. 8, 1950   4 Sheets-Sheet 1

INVENTOR
GEORGE E. ROWE
BY Parham + Bates
ATTORNEYS

Dec. 30, 1952  G. E. ROWE  2,623,648
GLASSWARE TRANSFER APPARATUS
Filed Dec. 8, 1950  4 Sheets-Sheet 2

INVENTOR
GEORGE E. ROWE
BY Parham + Bates
ATTORNEYS

Dec. 30, 1952  G. E. ROWE  2,623,648
GLASSWARE TRANSFER APPARATUS
Filed Dec. 8, 1950  4 Sheets-Sheet 3

INVENTOR
GEORGE E. ROWE
BY Parham & Bates
ATTORNEYS

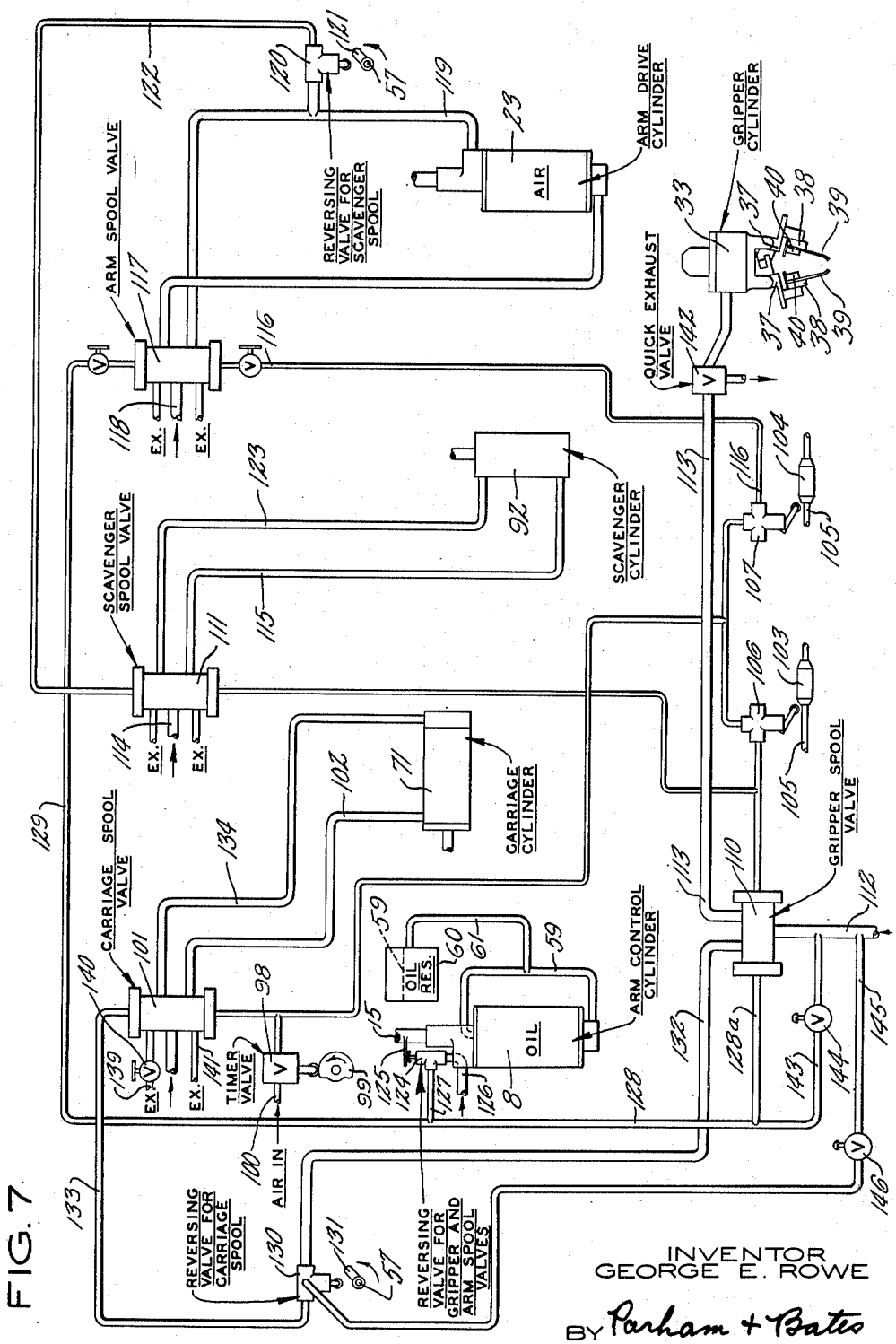

Patented Dec. 30, 1952

2,623,648

UNITED STATES PATENT OFFICE 2,623,648

GLASSWARE TRANSFER APPARATUS

George E. Rowe, Wethersfield, Conn., assignor to Emhart Manufacturing Company, a corporation of Delaware Application December 8, 1950, Serial No. 199,880

8 Claims. (Cl. 214—1)

This invention relates to improvements in apparatuses for transferring a row of articles, such as bottles or jars, from a moving conveyor to a second conveyor. An apparatus of this kind may be employed to transfer a row of articles at a single operation from a cross conveyor located at the front of a lehr onto the lehr conveyor although, of course, such an apparatus is not limited to that use.

In my copending application, Serial No. 738,951, I disclose and claim an apparatus of the kind referred to having a gang gripper mechanism movably supported and actuated to grasp a row of articles arriving at a receiving station when moving in the direction of and at least as great a speed as the row and then moving the row of grasped articles bodily along an arc of a circle of 180 degrees to a position directly over and across a lehr conveyor, the gripper mechanism then being actuated to release the row of transferred articles so as to deposit it as a transverse row on the lehr conveyor. The glassware transfer apparatus of my copending application has the advantage of achieving high stacking speed in terms of bottles placed on the lehr conveyor per minute while maintaining the advantages of low mechanism speed, a definite pattern of stacked ware on the lehr conveyor and minimum abrasion of the ware. The ware gripping means of the apparatus of my aforesaid copending application comprises cooperative rows of depending parallel closely spaced flexible and resilient gripper fingers adapted to grip a row of bottles or other articles of glassware securely when the rows of gripper fingers are closed even though the spacing between adjacent individual articles may vary and they may not be exactly in line in the row and the gripped portions of such articles may vary slightly in diameter among themselves. A gang gripper mechanism as just described also is disclosed and is individually claimed in my still earlier filed copending application, Serial No. 705,371, filed October 24, 1946, on which Patent No. 2,561,536 was granted on July 24, 1951.

The present invention provides a glassware transfer mechanism which is generally similar to that of my prior application, Serial No. 738,951, but is simpler in construction, cheaper to manufacture, capable of higher stacking speeds, and more dependable and less likely to get out of order or be impaired in service.

Improvement features of the apparatus of the present invention which distinguish it from that of my aforesaid application, Serial No. 738,951, include a simplified construction, having fewer parts requiring less maintenance. The drive cannot get out of position. It has no chains to jump sprockets. No ratchet or beveled gears are employed. The gang gripper mechanism of the improved apparatus of the present invention is carried by a shortened oscillatory arm means by which relatively higher glassware transfer and stacking speeds can be attained. The action of this oscillatory gripper mechanism carrying arm means is always dampened, thus obviating damage attributable to release of built-up forces developing from a jam or from overloading. The transfer apparatus of the present invention is pneumatically operated and includes convenient adjustments to allow for differences in ware height, in cross or supply conveyor height, in lehr or delivery conveyor height, and within limits, for a difference in level between the cross or supply conveyor and the lehr or delivery conveyor.

Further advantages and objects of the invention will appear from the following description of an illustrative glassware transfer apparatus of the present invention, as shown in the accompanying drawings, in which:

Fig. 1 is a front elevation of the improved glassware transfer apparatus with its gang gripper mechanism shown at the delivery or lehr-conveyor side of the machine, the conveyors being omitted;

Fig. 2 is an end elevation of the transfer apparatus in position to transfer a row of bottles from a cross or supply conveyor, shown in section at the left, to a lehr or delivery conveyor, shown by dot-and-dash lines at the right hand side of the view, the gang gripper mechanism of the apparatus being shown by dotted lines in its ware pick-up position and in full lines in position to deposit the row of transferred bottles onto the lehr conveyor;

Figure 1:
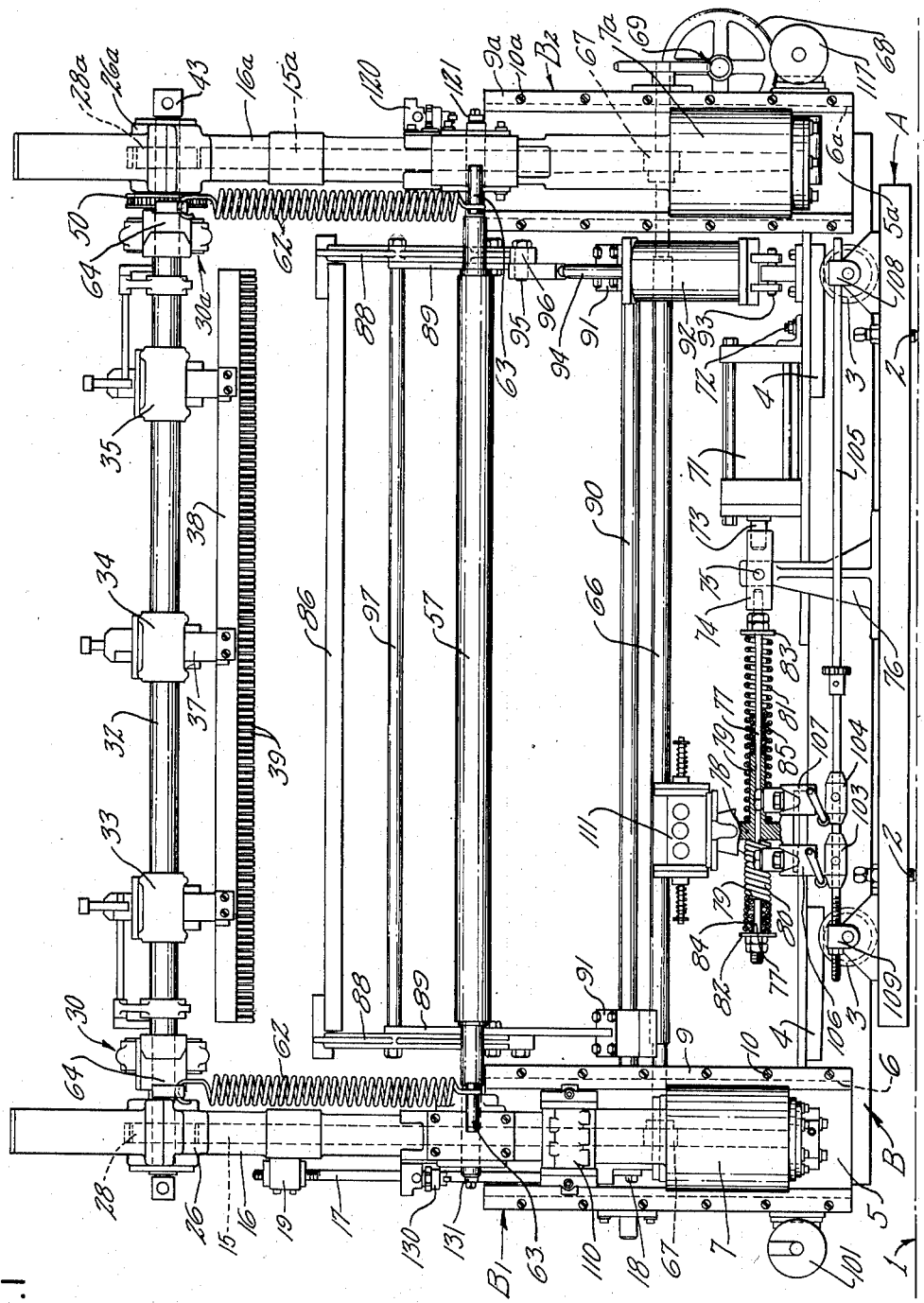
Figure 2:
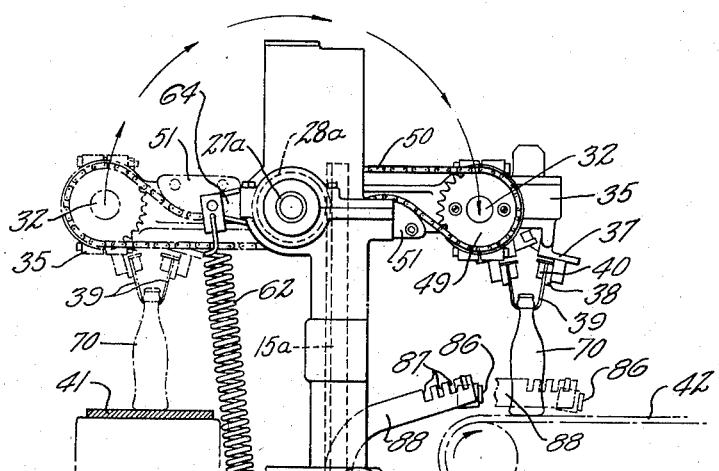

Referring now to the drawings, the apparatus comprises a supporting base A, Figs. 1 and 2, adjustably supported on a factory floor 1 or like surface by jack screws 2 or similar conventional elements. A carriage, indicated generally at B, is supported upon the base A for horizontal reciprocatory movements thereon, as by grooved wheels 3 on the base coacting with rails 4 fixed to the carriage.

Figure 3:
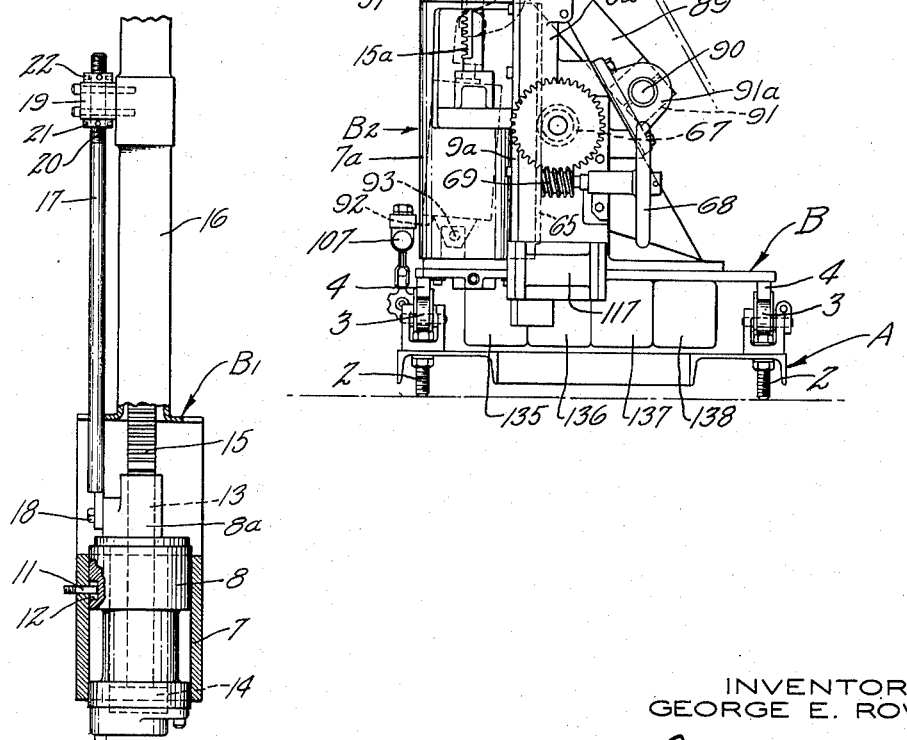
Fig. 3 is a fragmentary detail view mainly in elevation with portions shown in section, of an oil control cylinder and vertical rack bar combination included in the driving means for the oscillatory gang gripper mechanism, provided with a means to adjust the cylinder and rack bar combination vertically relative to its housing.

The carriage B is provided at its opposite ends with upright supports indicated generally at B-1 and B-2 respectively as viewed in Fig. 1. These uprights are in the main alike but differ in certain particulars which will be pointed out. The left hand upright B-1 comprises a stationary lower guiding section 5 fixed on the carriage and constructed to provide a vertical guideway 6 for a vertically disposed open ended cylindrical housing 7 in which is mounted a vertically disposed cylinder 8, Figs. 1 and 3. The vertical housing 7 is retained in a vertically adjusted position in the guideway 6, as by retaining or jib strips 9 secured to the stationary upright section 5 by screws 10. The cylinder 8 is held against turning about its vertical axis in the housing 7 but may be adjusted vertically therein to an extent limited by the coaction of a pin 11 projecting inwardly from the housing 7 into a vertical slot 12 in the wall of the cylinder. A piston rod 13 from a piston 14 in the cylinder 8 projects upwardly through the upper head 8a of the cylinder and carries a vertical rack bar 15. The rack bar 15 is housed by a tubular upward extension 16 of the housing 7. An adjusting rod 17 is fastened at its lower end at 18 to the upper cylinder head 8a and extends through a guide block 19 fixed to the housing extension 16. This adjusting rod 17 may be adjusted vertically by suitable known means, as by being screw threaded at 20 for engagement with nuts 21 and 22 which respectively bear on the upper and lower surfaces of the guide block 19. By appropriate manipulation of the nuts 21 and 22 to shift the rod 17 axially, the cylinder 8 will be adjusted vertically in the housing 7 together with its piston and the rack bar 15. The purpose and effect of this adjustment will hereinafter be explained.

The right hand upright B-2, as viewed in Fig. 1, includes a stationary lower section 5a on the carriage B. Section 5a provides a vertical guideway 6a in which is disposed a cylindrical housing 7a held in place in the guideway by jibs 9a and screws 10a. An air cylinder 23 is mounted in the housing 7a and may be secured in place therein, as by bolts 23a, Fig. 4. A piston 24 in cylinder 23 carries an upwardly extending rod 25 which in turn carries a rack bar 15a similar to the rack bar 15. Rack bar 15a is housed in a vertical tubular housing 16a generally similar to the housing 16.

Figure 5:
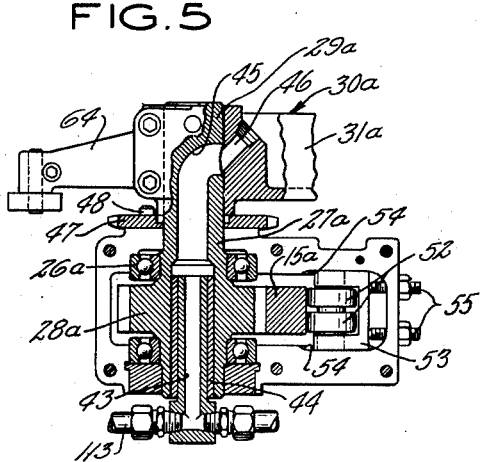
Fig. 5 is a section along the line 5—5 of Fig. 4, showing also a fragmentary portion of the connected lever of the gripper mechanism oscillating means.

The tubular housing extensions 16 and 16a are provided with aligned journal bearings 26 and 26a, respectively, Fig. 1, in which are journalled aligned horizontal stub shafts 27 and 27a respectively. These shafts carry pinions 28 and 28a, respectively, which may be integral therewith as indicated for the shaft 27a and pinion 28a respectively in Fig. 5. These pinions are housed in upper portions 16 and 16a of housings 7 and 7a and are in mesh with the vertical rack bars 15 and 15a, respectively. The short shafts 27 and 27a have inner end portions projecting from the inner or adjacent sides of their housings, as indicated at 29a for the shaft 27a in Fig. 5. These inwardly projecting shaft end portions carry levers 30 and 30a respectively having projecting parallel arms 31 and 31a, respectively. A horizontal gripper mechanism shaft 32 extends between and is journalled at its ends in the outer end portions of the lever arms 31 and 31a. The shaft 32 carries one or more gripper mechanism heads. In the assembly shown in Fig. 1, these are three in number and respectively are indicated at 33, 34 and 35. Each gripper mechanism head has a depending pair of levers 37, the lower portions of which support cooperative horizontal gripper bars 38. The bars 38 may be one-piece elements or each may comprise a plurality of sections joined end-to-end. The length of the bars 38 may be varied according to the length of a row of bottles or other articles to be picked up and transferred at each operation. The bars 38 have depending gripper fingers 39 clamped thereto, as by clamping bars 40. These gripper fingers preferably are made of flexible resilient material such as spring steel, so that their lower ends will flex to the extent required for dependable gripping of all the individual articles of a row on the supply conveyor, even though the gripped portions of the individual articles vary among themselves in diameter or are not exactly in line or spaced uniformly apart. The gang gripper mechanism just described may be used to pick up a row of articles from a supply or cross conveyor 41 for transfer to a delivery conveyor such as the lehr belt 42 as shown in Fig. 2. The gripper fingers, heads and other elements of the gang gripper mechanism, considered as a unit, may be substantially as described in greater detail in my copending application No. 738,951 and further described and claimed in my earlier filed copending application Serial No. 705,371. Therefore, it is deemed unnecessary to give a detailed explanation hereinafter of this gripper mechanism or of its specific action herein. Closing and opening of the cooperative sets of gripper fingers may be controlled by application and exhaust of compressed air or other suitable pressure fluid to and from the gripper mechanism. To this end, pressure fluid passages to the gripper mechanism heads may be provided in the oscillatory lever arms 31 and 31a and the gripper mechanism shaft 32, as in the gripper mechanism of my prior application No. 738,951. As shown in Fig. 5, an air nozzle 43 is fitted in a bushing 44 in one of the short shafts, as the shaft 27a and a bore 45 in the projecting end portion of that shaft communicates through a port 46 with the interior of the oscillatory gripper arm 31a when the latter is at the pickup end of its stroke. If it is desired to prevent direct contact of the gripper fingers with the gripped ware, asbestos strips (not shown) may be attached to the fingers suitably for this purpose.

The heads 33, 34 and 35 and the gripped articles suspended therefrom are kept vertical during oscillation of the lever arms by a parallel motion device comprising a sprocket 47 fixed, as by bolts 48, to the upper end of the journal bearing 26a in concentric relation to the short shaft 27a, a second sprocket 49 fast to the corresponding end of the gripper mechanism shaft 32 and a sprocket chain 50 trained about the sprockets 47 and 49 and kept taut by a pressure plate 51, Fig. 2.

Figure 4:
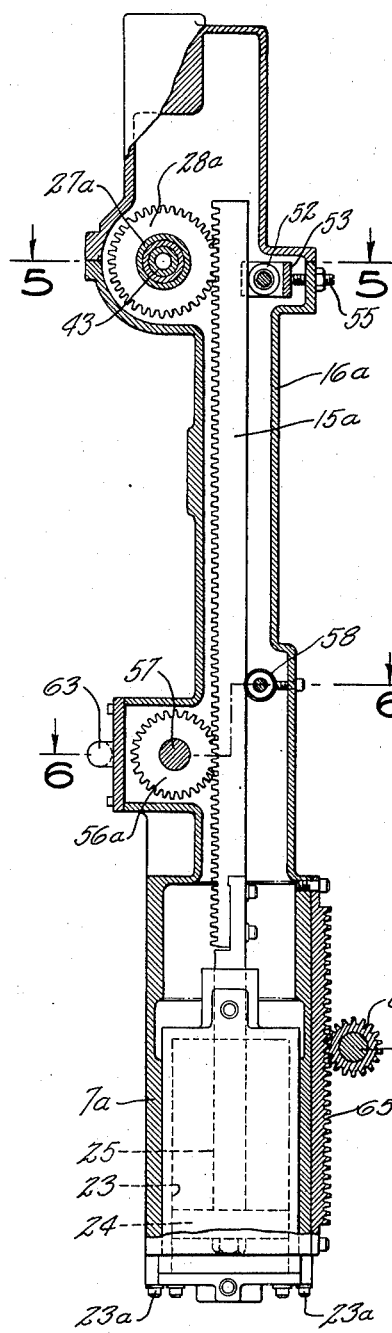
Fig. 4 is a vertical sectional view of an upright housing and support for a pneumatic cylinder and vertical rack bar of the apparatus drive, together with means for adjusting the height of the housing and associate parts.

The rack bars 15 and 15a are kept properly meshed with the pinions on the shafts 27 and 27a, as by pressure rolls 52, in holders 53 mounted for a limited sliding movement in grooved opposite walls 54 of an offset portion of the upright tubular housing and pressed against the back of the adjacent rack bar by adjustable screws 55, as shown for the associated pinion 28a and rack bar 15a, Figs. 4 and 5. Oscillation of the gripper mechanism lever arms is effected by reciprocation of the piston 24 in the air cylinder 23, thereby reciprocating the rack bar 15a. A pinion 56a in mesh with a rack bar 15a is fast on a torque shaft 57 extending between the uprights B-1 and B-2. See Figs. 4 and 6. A similar pinion 56 is provided on the opposite end of the torque shaft in mesh with the rack bar 15. The torque shaft 57 is journalled at its ends in suitable bearings in the uprights B-1 and B-2, one of such bearings being indicated at 157 in Fig. 6. The vertical rack bar 15 therefore will be reciprocated vertically in unison with the rack bar 15a under the compulsion of the air motor. The rack bar strokes will be dampened continuously by reason of the connection of the rack bar 15 with the piston 14 in oil cylinder 8. Continuous firm meshing of the rack bars with the pinions on the torque shaft 57 is effected by suitably adjustable pressure roll devices bearing against the backs of the rack bars, one of such pressure roll devices being indicated at 58 in Figs. 4 and 6.

The oil cylinder 8 communicates at its opposite ends with a by-pass oil line indicated at 59 in Fig. 7 so that the oscillations of the gripper mechanism lever arms will always be dampened by resistance to flow of oil pumped by the piston 14 in the oil cylinder 8 from one end of that cylinder through the pipe 59 to the opposite end thereof. Both the by-pass line 59 and the available space in the cylinder 8 at the ends of the piston therein are kept continuously full of oil, as from a reservoir 60 connected by a fill pipe 61 to the line 59 as shown in Fig. 7. The oil cylinder also acts as a snubber, eliminating any tendency for trip-hammer action due to any overload condition which may arise.

The oscillatory strokes of the gripper mechanism lever arms are further controlled by overthrow tension coil springs 62 provided at opposite ends of the carriage and each having its lower end anchored to a projection at 63 on the adjacent upright housing and having its upper end attached to a short arm 64 of the lever 30 or 30a. See Figs. 1 and 2 and also Fig. 5 for part 64 and Fig. 6 for part 63. The action of the springs 62 is to aid each oscillatory stroke of the gripper mechanism lever arms during its initial part and to dampen the final part of each such stroke.

Figure 6:
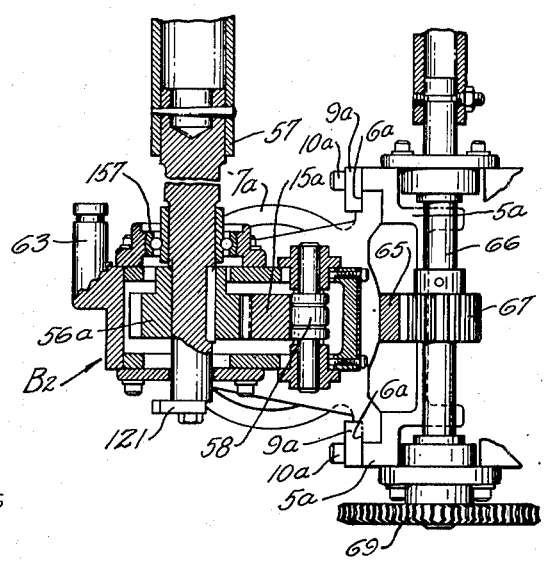
Fig. 6 is a section along the line 6—6 of Fig. 4 and showing additional associate elements, and, Fig. 7 is a diagram of the piping and control mechanisms of the apparatus.

The height of the path of oscillatory movements of the gripper mechanism at the outer ends of the oscillatory lever arms may be adjusted within limits for transfer of glassware of different heights by vertical adjustments of the cylinder and rack systems and their surrounding housings, as a unit, relative to the lower stationary sections of the supporting uprights. To this end, the housings 7 and 7a may be provided with vertical rack elements as indicated at 65 for the housing 7a in Figs. 4 and 6. A cross shaft 66, Fig. 1 carries adjusting pinions 67 in mesh with the housing racks as shown in Figs. 4 and 6. A hand wheel 68 is geared at 69, Figs. 1 and 2, to the shaft 66 for rotating adjusting cross shaft 66 to effect the vertical adjustment of the gripper mechanism lever arms and their supports. Differences in level between the supply or cross conveyor and the delivery of lehr conveyor may exist within limits, as up to 4 inches, either way, and may be accommodated by adjusting the vertical rod 17, Figs. 1 and 3, as and with the effect hereinbefore described. The air cylinder 23 is sufficiently longer internally than the strokes of its piston therein to permit this adjustment.

The carriage B is reciprocated on its base A appropriately for the transfer of a row of bottles 70 from the cross conveyor 41 to the lehr belt 42 with the advantages hereinbefore mentioned. The carriage reciprocating mechanism comprises an air cylinder 71 secured, as at 72, on the carriage so that its piston rod, indicated at 73, projects from one end of the cylinder parallel with the axis of oscillation of gang gripper transfer arms 31, 31a and hence also parallel with the gang gripper jaws and with the row of bottles 70 on the cross conveyor 41. The piston rod 73 is made fast to a block 74 which is fixed, as at 75, to a bracket 76 on the supporting base A. A rod 77 projects from this block in line with the piston rod 73 through a traveler 78 on the carriage. The traveler 78 has tubular opposite end portions 79. Carriage movement cushioning means comprises coil springs 80 and 81 respectively surrounding the tubular portions 79 of the traveler 78 and the end portions of the rod 77 so as to bear at their opposite ends against stop elements 82 and 83 adjustably secured on the end portions of the rod. Shorter inner coil springs 84 and 85 respectively may be provided around the rod at opposite ends of the traveler tubular extensions. Movement of the carriage on its base in either direction will be cushioned by one of the springs 80 or 81 during part of its stroke and the cushioning action will be increased during the final part of that stroke by compression of an inner spring 84 or 85 also. The return movement of the carriage is aided by this arrangement at the beginning of the return stroke.

The transfer apparatus also includes a scavenger bar which is moved on working strokes alternately with the ware delivery strokes of the transfer arms to clear away any ware left by the gripper mechanism which, if not removed, would interfere with the deposit of the next transferred row of articles. As shown in Figs. 1 and 2, this bar, designated 86 is supported at its ends in preselected aligned notches or transverse slots 87 in the upper edges of outwardly turned end portions 88 of lever arms 89 which are pivotally supported at their lower ends at 91 by a cross shaft 90 mounted in bearings 91a on the carriage. An air cylinder 92 for operating the scavenger bar is pivotally supported at its lower end at 93 on the carriage. A piston rod 94 protrudes from the upper end of the air cylinder 92 and is attached at 95 to an actuating knuckle or short arm 96 on one of the levers 89. The lever arms may be tied together by a cross bar 97.

The transfer apparatus is air operated as has been stated. A cycle of glassware transfer operations thereof is initiated by opening of a timing valve 98, Fig. 7, as by a cam 99 so as to supply air from an intake line 100 to one end of a carriage spool valve 101 which is located on the left hand end of the carriage as viewed in Fig. 1. Timing valve 98 is usually mounted on a glassware forming machine producing the ware to be stacked into a lehr by the transfer apparatus but it may be located elsewhere. The cam is suitable to maintain the valve 98 open for a relatively long puff or application of air to the carriage spool valve. Throwing of the carriage spool valve 101 will admit air through the line indicated at 102 to the carriage cylinder 71 so as to start the carriage moving in the same direction as the row of bottles on the cross conveyor 41. After a brief period, barrel cams 103 and 104 respectively on a rod 105 which is mounted on the carriage base, trip air saver valves 106 and 107, respectively, which are mounted on the carriage, Fig. 1. The tripping of these valves should occur when the carriage has attained a speed at least equal to that of the moving ware although a slightly higher speed may not be objectionable. The positions of the cams 103 and 104 may be adjusted by adjusting the rod 105 in the direction of its length, such rod being supported slidably at one end in a bearing 108 and screw-threadedly engaged with a second bearing or support 109. Air from the valve 106, Fig. 7, will pass to the adjacent end of a gripper spool valve 110 and also to the adjacent end of a scavenger spool valve 111. The gripper spool valve receives air from an air intake 112 and, as tripped by the operation of the valve 106, supplies air through a line 113 to the air cylinders of the gripper mechanism heads 33, 34 and 35, the former of which is indicated in Fig. 7. Flow of operating air to these gripper mechanism heads may be effected through the hollow gripper mechanism oscillating arms and the gripper mechanism shaft 32 as aforesaid, the line 113 leading to the nozzle 43 for supplying air to this assembly as hereinbefore described and as shown in part in Fig. 5. The air supplied to the gripper mechanism heads will cause closing of the grippers to grasp the row of moving bottles on the conveyor 41. The operating air supplied to the scavenger spool valve will operate that valve so that the air from its intake pipe 114 will pass through an air line 115 to the scavenger cylinder 92 so as to cause a ware-clearing or working stroke of the scavenger bar 86.

Air supplied through the second air saver valve, that is, 107, will pass therefrom through an air line 116 to the adjacent end of the arm spool valve 117. The consequent operation of this spool valve will permit air from an intake line 118 to pass through an air line 119 to the upper end of the arm drive cylinder 23. The lever arms carrying the grippers thus will be started on their swing through an arc of 180° in properly timed relationship to the operations of the scavenger bar and to the closing of the grippers to grasp a row of ware at the receiving station.

The cam 99 controlling the timing valve 98 now will have been turned sufficiently to permit closing of that valve so as to cut off air supplied to the gripper mechanism system from that source. This will be effected just before the lever arms carrying the grippers arrive at their ware delivery position over the lehr belt 42. Also, just before this happens, a pilot valve 120, mounted on the right hand upright housing will be tripped by a cam 121 on the torque shaft 57. This action results in delivery of a puff of air through a line 122 to the second end of the scavenger spool valve 111, thus reversing that valve so that it now delivers air through a line 123 to the scavenger cylinder 92 to effect a return stroke of the scavenger bar in time to clear the space over the lehr belt where a row of bottles is about to be delivered by the gripper mechanism.

When the gripper mechanism lever arms have made their swing of 180°, a pilot valve 124 on the left hand upright housing will be tripped by an element 125 on the oil control cylinder rack 15. This will permit air from an air intake pipe 126 to pass through a line 127 and lines 128 and 128a to the gripper spool valve 110 and also from line 127 through a line 129 to the second end of the arm spool valve 117. These spool valves will be reversed, causing opening of the grippers to set the ware down on the lehr belt and starting the gripper mechanism lever arms on their return oscillatory swing of 180°.

At some time during this return swing, a pilot valve 130 on the left hand upright housing will be tripped by a cam 131 on the torque shaft. Air from the gripper spool valve 110 will at this time be passing through a line 132 to the valve 130 and air from the valve 130 will then pass through a line 133 to the second end of the carriage spool valve 101. The carriage spool valve thus will be reversed and air therefrom will pass through a line 134 to the second end of the carriage cylinder, thus causing return of the carriage to its original position ready to start a new cycle. While the pilot valves 120 and 130 will be tripped twice by the cams on the torque shaft during a complete cycle of oscillatory movements of the gripper mechanism lever arms, each such pilot valve will be active only once to perform a function since at the other time each will be cut off from its air supply.

The air for operating the pneumatic control and operating mechanisms may be obtained from any suitable source and regulated as efficiency of operation dictates. Air at a pressure of possibly 25 pounds per square inch is sufficient to provide a rapid motion of the carriage and to swing the gripper mechanism oscillatory arms through their 180° arc sufficiently fast to insure a frequency of 8 trips per minute. When the apparatus is used as a stacker, this speed gives enough stacking capacity for practically any job requirement. Air may be supplied at a slightly higher pressure, as from 35 to 40 pounds per square inch, to the various spool valves so as to insure relatively rapid control operations of these valves and air at this higher pressure also may be utilized to force oil from a pressure oil tank, not shown, through the various lubricating lines and passages (also not shown) with which the apparatus may be provided. As a convenient way to supply air to the moving parts on the carriage, such carriage may be provided with a number of different compartments, four being indicated at 135, 136, 137 and 138 respectively, Fig. 2. The pressure oil tank referred to may be located in one of these compartments, as in the compartment 135. The higher pressure air may be supplied to another compartment, as compartment 138. This will leave the two middle compartments 136 and 137 for the lower pressure air. It will be understood that the air in the lines referred to as leading to the various spool valves and other air pressure utilizing mechanisms may pass to such valves and mechanisms from the appropriate air compartments of the carriage.

The carriage is reciprocable back and forth against the cushioning resistance of the springs 80, 81, 84 and 85 and these springs also serve as a booster to accelerate the carriage movement at the beginning of its stroke in the direction of movement of the ware at the receiving station so that the gang grippers will quickly attain the same speed as the moving ware conveyor. The speed of the carriage for the article pick-up stroke is determined by controlling the exhaust from one end of the carriage spool valve 101. Exhaust from this end of the spool valve 101 is through a line 139, Fig. 7, provided with a valve 140. Exhaust from the spool valve 101 for the return stroke is through a fixed exhaust opening at 141.

The line 113 for passing air to the gripper mechanism heads is provided with a quick exhaust valve, indicated at 142, to permit quick opening of the grippers when the pressure to the gripper mechanism heads has been shut off. The time relation between the closing of the grippers and the start of the delivery swing of the gripper mechanism lever arms is controlled by the spacing of the two barrel cams 103 and 104 on the rod 105 in relation to the valves 106 and 107. These valves should be adjusted to trip just after the carriage starts to travel so that the gripper fingers will close during the middle of the carriage pick up stroke as the carriage will then have attained a speed at least equal to that of the supply conveyor.

The air intake line 112 is connected by a branch line 143 with the line 128 and through the line 127 to the valve 124. A normally closed manually operable valve 144 normally keeps the line 143 inactive. Similarly, a line 145 provided with a normally closed valve 146 connects the air intake line 112 with the valve 130. Opening of the valve 144 will reverse the gripper and arm spool valves as required to effect opening of the grippers and return of the oscillatory gripper mechanism arms to the pick up or cross conveyor side of the apparatus. Opening of the valve 146 will act through valve 130 to trip the carriage spool valve so as to return the carriage to its starting position. These manually operable provisions are available should the ware transfer apparatus be stalled with the parts referred to in the positions indicated.

The racks and the oscillatory lever arm pinions and torque shaft pinions of the apparatus drive will be retained in close mesh so that there will be no appreciable back lash. Contact of the pressure rollers against the backs of the racks in conjunction with pre-setting of the torque shaft bearings to mesh the torque shaft pinions properly with the racks will assure this result. The continuous dampening of the strokes of the oscillating gripper mechanism lever arms will eliminate any danger to the moving parts of the device because of jerky or trip-hammer throw of the arms on release of built up forces developing from a jam or overloading. The apparatus will operate in rapidly repeated cycles dependably and smoothly to transfer successive single file pluralities of bottles or other articles of glassware from a moving cross or other supply conveyor to a lehr or other delivery conveyor and to maintain a desirable pattern of stacking or arrangement of the transferred ware on the delivery conveyor. The pre-setting and operating adjustments of the apparatus adapt it for highly efficient use under any set of service conditions likely to be encountered.

Many changes in and modifications of the illustrative apparatus shown in the accompanying drawings and herein particularly described will now be apparent to those skilled in the art and I therefore do not wish to be limited to the details of the illustrated example.

I claim:

1. A gang glassware transfer apparatus comprising a movably supported horizontally reciprocable carriage, upright rigid supporting means fixed to the carriage, transfer arm means pivoted at one end and to said upright rigid supporting means at a predetermined height above the carriage to swing about a horizontal axis parallel with the path of reciprocatory movements of the carriage, a gang gripper mechanism carried by the outer end of said transfer arm means, and means to oppose continuously a substantially constant dampening force to the oscillatory movements of the pivoted transfer arm means, said last named means comprising an oil cylinder, a piston reciprocable therein, a transmission operatively connecting the piston with the pivoted transfer arm means to move said piston in said cylinder in response to oscillatory movement of the pivoted transfer arm means about its said horizontal axis, and an oil bypass line for conducting oil from either end of the cylinder to the other under pressure from the piston moving in the cylinder, said bypass line and the space within each end of the cylinder ahead of said piston being continuously filled with oil.

2. A gang glassware transfer apparatus as defined by claim 1 and, in combination therewith, spring means associated with said carriage to aid each reciprocatory stroke thereof at its beginning and to retard and cushion the final part of each such stroke.

3. A gang glassware transfer apparatus comprising a movably supported horizontally reciprocable carriage, a pair of rigid supporting uprights secured on the carriage to move therewith, the individual uprights being spaced apart in the direction of the path of reciprocatory movements of the carriage, a pair of rigid arms having inner end portions pivoted to said uprights to swing about a horizontal axis parallel with the path of reciprocatory movements of the carriage, a gang gripper mechanism extending between and carried by the outer ends of said rigid arms, means to oscillate said arms about said horizontal axis to move said gripper mechanism back and forth between glassware pick-up and delivery stations, respectively, located at opposite sides of the axis of oscillation of said arms, means to reciprocate said carriage in coordination with the oscillations of said arms to cause movement of said gripper mechanism at the pick-up station along a path parallel with said axis of oscillation and to return the gripper mechanism to its starting position at the pick-up station during return thereof from the delivery station by an oscillatory movement of the pivoted arms, said means to oscillate said arms about said horizontal axis being constructed and arranged to move the arms through an arc of approximately 180° at each stroke thereof, means associated with said means to oscillate said arms for adjusting the angle relative to the horizontal of said arms at the opposite ends of their oscillatory strokes, and overthrow tension coil spring means operatively connecting said oscillatory arms with stationary anchoring means to aid each oscillatory stroke of said arms at the beginning thereof and yieldingly to oppose the final part of each such oscillatory stroke.

4. A gang glassware transfer apparatus comprising a movably supported horizontally reciprocable carriage, a pair of rigid supporting uprights secured on the carriage to move therewith, the individual uprights being spaced apart in the direction of the path of reciprocatory movements of the carriage, a pair of rigid arms having inner end portions pivoted to said uprights to swing about a horizontal axis parallel with the path of reciprocatory movements of the carriage, a gang gripper mechanism extending between and carried by the outer ends of said rigid arms, means to oscillate said arms about said horizontal axis to move said gripper mechanism back and forth between glassware pick-up and delivery stations, respectively, located at opposite sides of the axis of oscillation of said arms, means to reciprocate said carriage in coordination with the oscillations of said arms to cause movement of said gripper mechanism at the pick-up station along a path parallel with said axis of oscillation and to return the gripper mechanism to its starting position at the pick-up station during return thereof from the delivery station by an oscillatory movement of the pivoted arms, said means to oscillate said arms about said horizontal axis being constructed and arranged to move the arms through an arc of approximately 180° at each stroke thereof, means associated with said means to oscillate said arms for adjusting the angle relative to the horizontal of said arms at the opposite ends of their oscillatory strokes, said rigid supporting uprights on the carriage comprising stationary lower sections fixed to the carriage and vertically adjustable upper sections carrying said pivoted oscillatory arms, and means to adjust the height relative to the stationary lower sections of the vertically adjustable sections of said uprights.

5. A gang glassware transfer apparatus comprising a movably supported horizontally reciprocable carriage, a pair of rigid supporting uprights secured on the carriage to move therewith, the individual uprights being spaced apart in the direction of the path of reciprocatory movements of the carriage, a pair of rigid arms having inner end portions pivoted to said uprights to swing about a horizontal axis parallel with the path of reciprocatory movements of the carriage, a gang gripper mechanism extending between and carried by the outer ends of said rigid arms, means to oscillate said arms about said horizontal axis to move said gripper mechanism back and forth between glassware pick-up and delivery stations, respectively, located at opposite sides of the axis of oscillation of said arms, means to reciprocate said carriage in coordination with the oscillations of said arms to cause movement of said gripper mechanism at the pick-up station along a path parallel with said axis of oscillation and to return the gripper mechanism to its starting position at the pick-up station during return thereof from the delivery station by an oscillatory movement of the pivoted arms, said means to oscillate said arms about said horizontal axis being constructed and arranged to move the arms through an arc of approximately 180° at each stroke thereof, means associated with said means to oscillate said arms for adjusting the angle relative to the horizontal of said arms at the opposite ends of their oscillatory strokes, a pair of generally upright arms pivotally mounted on said carriage to swing about a horizontal axis parallel with the horizontal axis of oscillation of said first named pair of arms, the second named pair of arms having curved upper end portions turned toward the glassware delivery station, a transverse bar extending between and supported by the upper end portions of said second named pair of arms, and means to oscillate said second named pair of arms to move said transverse bar carried therewith back and forth across the delivery station in alternation with the oscillatory movements of the first named pair of arms to bring the gripper mechanism to that station.

6. A glassware transfer mechanism comprising a movably supported horizontally reciprocable carriage, a pair of rigid supporting uprights on the opposite ends of the carriage, each of said uprights comprising a stationary lower section fixed to the carriage and a vertically adjustable hollow upper section secured to the lower section, axially aligned stub shafts journalled in the upper portions of said supporting uprights, rigid transfer arms having inner end portions secured to said shafts, a gang gripper mechanism extending between and carried by the outer ends of said arms, pinions fixed to said shafts, vertical rack bars housed within said uprights in mesh with said pinions, an air motor having a driving connection with one of said rack bars to shift it vertically to oscillate one of said shafts, a torque shaft extending between said uprights, pinions on said torque shaft in mesh with said rack bars so that vertical movement of the rack bar driven by said air motor will cause a like movement of the second rack bar, an oil cylinder supported at the lower end of the second rack bar, and a piston in said oil cylinder having a driven connection with the second rack bar to oppose a substantially constant continuous dampening action to the oscillation of said arms by the driving action of said air motor.

7. A gang glassware transfer apparatus as defined by claim 6 and, in combination therewith, means to effect vertical adjustment of the oil cylinder in its support together with its piston and connected rack bar to adjust the angle to the horizontal of the oscillatory arms at the beginning and end of oscillatory strokes thereof through an arc of 180°.

8. A gang glassware transfer apparatus comprising a substantially flat base, a carriage mounted for reciprocation on the base, a pair of rigid supporting uprights fixed on opposite ends of the carriage, a pair of rigid arms having inner end portions pivoted to the upper end portions of the uprights to swing about a horizontal axis parallel with the path of reciprocatory movements of the carriage, a gang gripper mechanism extending between and carried by the outer ends of said rigid arms, means to oscillate said arms about said horizontal axis to move said gripper mechanisms along an arc of approximately 180° between glassware pick-up and delivery stations respectively located at opposite sides of the axis of oscillation of said arms and means to oscillate said carriage on said base, said means comprising an horizontally disposed air cylinder secured to the carriage, a piston rod projecting from one end of said cylinder and secured to the base, a rod projecting in alignment with the piston rod in a fixed position on the base, a traveler fixed to the carriage and slidable on said rod, fixed abutments on said rod spaced from opposite ends of the traveler and coil spring means arranged on the rod between opposite ends of the traveler and said abutments to aid the beginning of each reciprocatory stroke of the carriage on the base and to cushion the final part of that reciprocatory movement.

GEORGE E. ROWE.

REFERENCES CITED

The following references are of record in the file of this patent:

UNITED STATES PATENTS

| Number | Name | Date |
| --- | --- | --- |
| 1,867,389 | Sylvester | July 12, 1932 |
| 1,878,156 | Lorenz | Sept. 20, 1932 |